(12) United States Patent
Choi

(10) Patent No.: US 8,839,747 B2
(45) Date of Patent: Sep. 23, 2014

(54) COMPOSITE POWER CYCLE ENGINE

(71) Applicants:Hyundai Motor Company, Seoul (KR);
Kia Motors Corporation, Seoul (KR)

(72) Inventor: Myungsik Choi, Seoul (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 0 days.

(21) Appl. No.: 13/693,827

(22) Filed: Dec. 4, 2012

(65) Prior Publication Data

US 2013/0146020 A1   Jun. 13, 2013

(30) Foreign Application Priority Data

Dec. 7, 2011 (KR) .................. 10-2011-0130159

(51) Int. Cl.
*F02B 47/02* (2006.01)
(52) U.S. Cl.
CPC ............... *F02B 47/02* (2013.01); *Y02T 10/121* (2013.01); *Y02T 10/16* (2013.01)
USPC .................... 123/25 A; 123/445; 123/25 B
(58) Field of Classification Search
CPC ..... Y02T 10/121; Y02T 10/16; Y02T 10/166; Y02T 10/20; Y02T 10/47; Y02T 10/123; F02B 47/02; F02M 25/022; F02M 25/0228; F02M 69/045; F01N 2240/22
USPC ................... 123/25 A, 25 B, 25 C, 25 F, 25 P
See application file for complete search history.

(56) References Cited

U.S. PATENT DOCUMENTS

| | | | | |
|---|---|---|---|---|
| 4,143,518 | A * | 3/1979 | Kellogg-Smith | 60/712 |
| 4,417,447 | A * | 11/1983 | Thomas | 60/712 |
| 5,522,349 | A * | 6/1996 | Yoshihara et al. | 123/25 C |
| 7,793,493 | B1 * | 9/2010 | Mcilroy | 60/315 |
| 7,997,080 | B2 | 8/2011 | Harmon, Sr. et al. | |
| 2003/0188700 | A1 * | 10/2003 | Mitsuhashi et al. | 123/25 C |
| 2009/0320789 | A1 * | 12/2009 | Lund | 123/299 |
| 2010/0319636 | A1 * | 12/2010 | Buchanan et al. | 123/3 |

FOREIGN PATENT DOCUMENTS

| | | |
|---|---|---|
| JP | 06-101495 A | 4/1994 |
| JP | 2002-054510 A | 2/2002 |
| KR | 1020070007743 A | 1/2007 |

* cited by examiner

*Primary Examiner* — Noah Kamen
*Assistant Examiner* — Long T Tran
(74) *Attorney, Agent, or Firm* — Morgan, Lewis & Bockius LLP

(57) ABSTRACT

A composite power cycle engine may include a fuel injector that injects fuel into air that is or is to be supplied into a combustion chamber, a high temperature medium injector that injects a high temperature medium into the combustion chamber to increase pressure of the combustion chamber, a low temperature medium injector that injects a low temperature medium into the combustion chamber to reduce pressure of the combustion chamber, and a piston that may be disposed in the combustion chamber to slidably move therein and that transforms gas expansion or contraction energy into kinetic energy, wherein the high temperature medium injector or the low temperature medium injector increases or reduces the pressure of the combustion chamber so as to generate power.

18 Claims, 3 Drawing Sheets

COMPOSITE POWER CYCLE ENGINE

CROSS-REFERENCE TO RELATED APPLICATION

The present application claims priority to Korean Patent Application No. 10-2011-0130159 filed in the Korean Intellectual Property Office on Dec. 7, 2011, the entire contents of which is incorporated herein for all purposes by this reference.

BACKGROUND OF THE INVENTION

1. Field of the Invention

The present invention is related to a composite power cycle engine that reuses energy that is discharged outside to enhance energy efficiency and reduces fossil fuel consumption to be able to reduce cost.

2. Description of Related Art

Generally, an engine of a vehicle mixes fossil fuel with air and combusts it to generate rotational energy.

However, of possible energy derived from the fuel, only about 30% is used, as about 30% is wasted due to fuel that is not combusted but is exhausted, about 30% is lost as thermal energy, and about 10% is lost as friction energy.

Accordingly, a composite power cycle that can fundamentally reduce the energy loss has been researched.

Particularly, in one such research system, exhaust gas of the engine is used to generate high temperature steam and the steam rotates a turbine to recover lost energy, but this energy recovery system needs expensive devices such as turbine generator which complicates the system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a composite power cycle engine having advantages of improving efficiency by reusing heat energy that is lost through exhaust gas, reducing exhaust gas, and simplifying the system.

In an aspect of the present invention, a composite power cycle engine may include a fuel injector that injects fuel into air that is or is to be supplied into a combustion chamber, a high temperature medium injector that injects a high temperature medium into the combustion chamber to increase pressure of the combustion chamber, a low temperature medium injector that injects a low temperature medium into the combustion chamber to reduce pressure of the combustion chamber, and a piston that is disposed in the combustion chamber to slidably move therein and that transforms gas expansion or contraction energy into kinetic energy, wherein the high temperature medium injector or the low temperature medium injector increases or reduces the pressure of the combustion chamber so as to generate power.

A plurality of cylinders may include an activated cylinder of which the fuel injector is operated, and a deactivated cylinder of which the fuel injector is not operated, wherein the high temperature medium injector or the low temperature medium injector is disposed in the deactivated cylinder to be operated.

The high temperature medium of the high temperature medium injector is high temperature steam, and the low temperature medium is low temperature moisture that may have a lower temperature than the high temperature steam.

The high temperature medium injector and the low temperature medium injector are not operated while the fuel injector is being operated.

The composite power cycle engine may further include a heat exchanger that is disposed on an exhaust line through which an exhaust gas flows and fluid-connected to the high temperature medium injector via a first line, wherein the heat exchanger supplies the high temperature medium injector with the high temperature medium through the first line.

The composite power cycle engine may further include a medium pump fluid-connected with the heat exchanger via a third line and supplies the low temperature medium to the heat exchanger through the third line such that the low temperature medium is changed into the high temperature medium.

The composite power cycle engine may further include a condenser that is disposed at a downstream side of the heat exchanger on the exhaust line, wherein the condenser uses the low temperature medium that is supplied from the medium pump to condense moisture that is may include d in the exhaust gas.

The low temperature medium may include water.

The composite power cycle engine may further include a medium pump that is fluid-connected with the low temperature medium injector via a second line and supplies the low temperature medium injector with the low temperature medium through the second line, The composite power cycle engine may further include a reservoir that is disposed between the medium pump and the low temperature medium injector on the second line to temporarily store the low temperature medium.

The composite power cycle engine may further include a condenser that is disposed at a downstream side of the heat exchanger on the exhaust line, wherein the condenser uses the low temperature medium that is supplied from the medium pump to condense moisture that is may include d in the exhaust gas.

The high temperature medium and the low temperature medium may include water or steam.

The fuel injector injects gasoline or diesel, and the low temperature medium injector and the high temperature medium injector respectively injects a medium of different temperatures including moisture.

In another aspect of the present invention, a composite power cycle system, may include a fuel injector that injects fuel into air that is or is to be supplied into a combustion chamber, a high temperature medium injector that injects a high temperature medium into the combustion chamber to increase pressure of the combustion chamber, a low temperature medium injector that injects a low temperature medium into the combustion chamber to reduce pressure of the combustion chamber, a piston that is disposed in the combustion chamber to slidably move therein and that transforms gas expansion or contraction energy into kinetic energy, and a control portion that controls the high temperature medium injector or the low temperature medium injector to increase or reduce the pressure of the combustion chamber so as to generate power through the piston.

A plurality of cylinders may include an activated cylinder of which the fuel injector is operated, and a deactivated cylinder of which the fuel injector is not operated, wherein the high temperature medium injector or the low temperature medium injector is disposed in the deactivated cylinder to be operated.

The high temperature medium injector injects high temperature steam into the cylinder, and the low temperature medium injector injects low temperature moisture that may have a lower temperature than the high temperature steam into the cylinder.

The composite power cycle system may further include a heat exchanger that is disposed on an exhaust line through which an exhaust gas flows, wherein the heat exchanger supplies the high temperature medium injector with the high temperature medium through a first line that fluid-connects the heat exchanger to the high temperature medium injector.

The fuel injector injects gasoline or diesel, and the low temperature medium injector and the high temperature medium injector respectively injects a medium of different temperatures including moisture.

The present invention uses the medium such as water so as to recover energy that is lost through exhaust gas, and injects the medium into a combustion cylinder as steam to effectively recover lost energy as kinetic energy.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
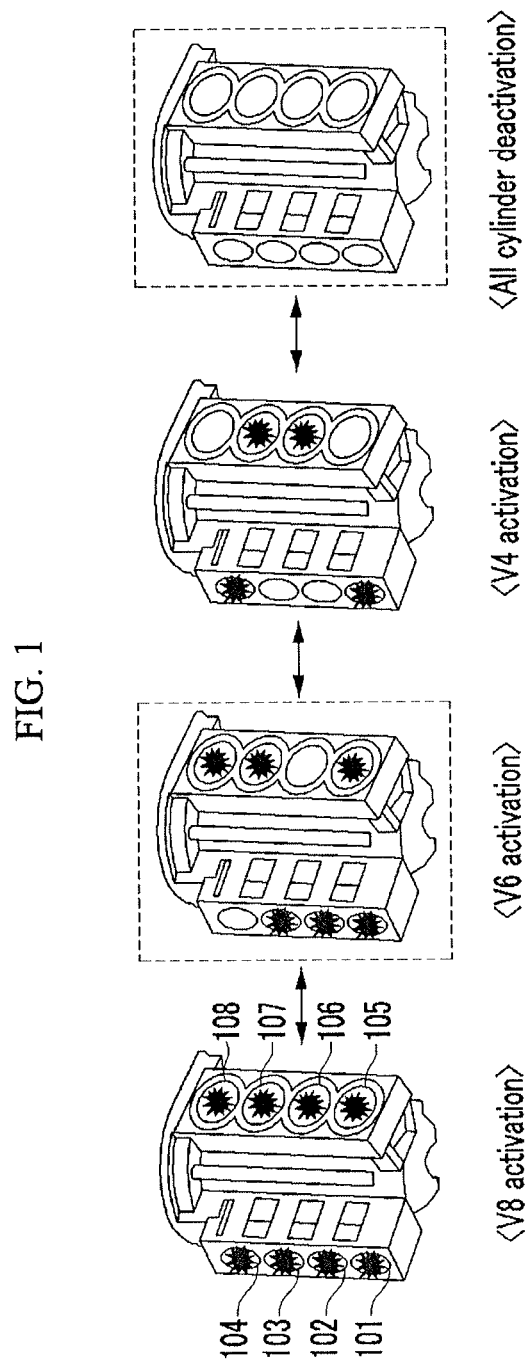
FIG. 1 is a perspective view showing activated cylinders and deactivated cylinders in a composite power cycle engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view showing activated cylinders and deactivated cylinders in a composite power cycle engine according to an exemplary embodiment of the present invention.

Referring to FIG. 1, an engine includes a first cylinder 101, a second cylinder 102, a third cylinder 103, a fourth cylinder 104, a fifth cylinder 105, a sixth cylinder 106, a seventh cylinder 107, and an eighth cylinder 108.

In an exemplary embodiment of the present invention, the numbers of the cylinders are arbitrarily numbered for convenience, and the order thereof and the drawing numbers can be differently applied.

As shown, all cylinders are activated in a V8 mode, and the fourth cylinder 104 and the sixth cylinder 106 are deactivated in a V6 mode.

The second cylinder 102, the third cylinder 103, the fifth cylinder 105, and the eighth cylinder 108 are deactivated in a V4 mode. All cylinders can be deactivated in an all-cylinder-deactivation mode.

The cylinder deactivation (CDA) mode realizes a condition in which gasoline or diesel fuel is not injected to all cylinders, such that some of the cylinders are deactivated and remaining cylinders are activated. Accordingly, when a load of the engine is low, unnecessary fuel consumption can be reduced.

Meanwhile, although some cylinders are deactivated to reduce fuel consumption, the fuel that is injected into activated cylinders is lost as heat energy of the exhaust gas, and therefore the lost energy can be recovered as kinetic energy.

Figure 2:
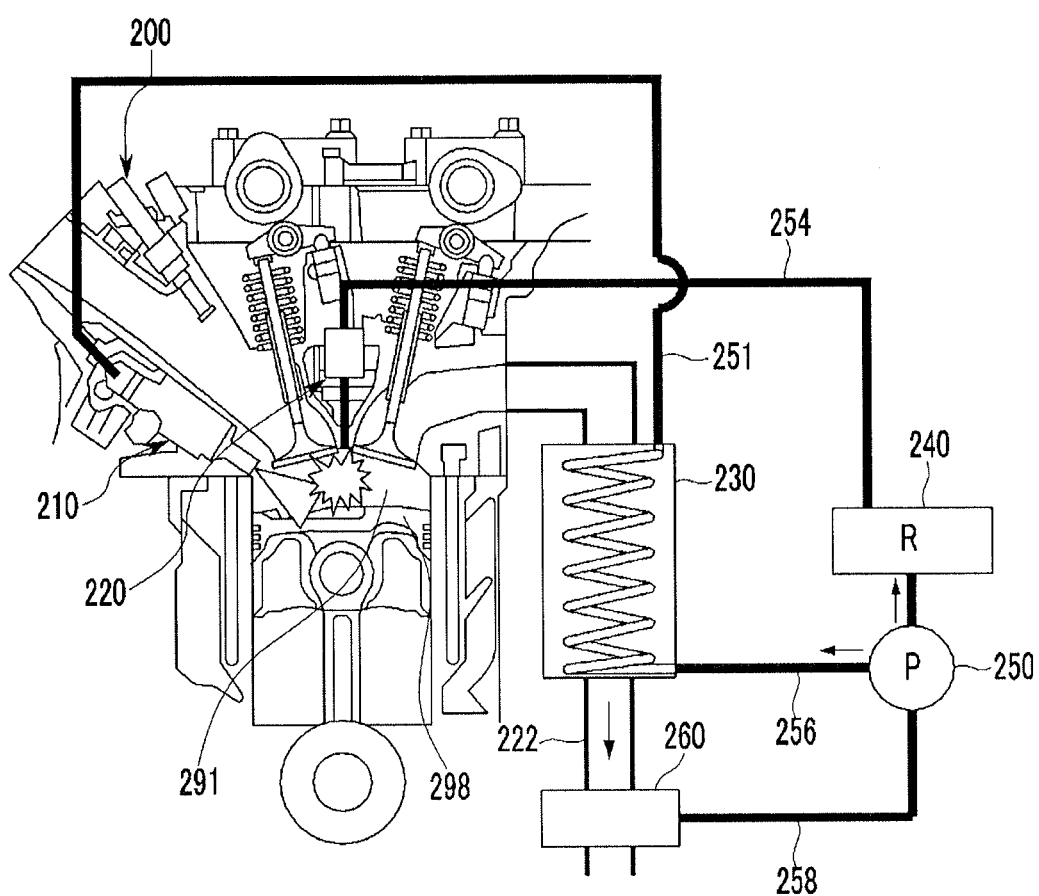
FIG. 2 is a partial inner cross-sectional view schematically showing a composite power cycle engine according to an exemplary embodiment of the present invention.
Figure 3:
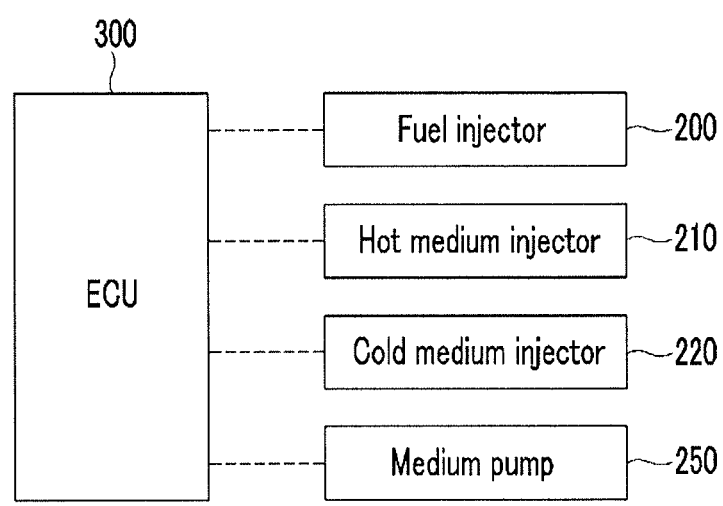
FIG. 3 is a schematic diagram of a composite power cycle engine according to an exemplary embodiment of the present invention.

Referring to FIG. 2 and FIG. 3, this method will be further explained.

FIG. 2 is a partial inner cross-sectional view schematically showing a composite power cycle engine according to an exemplary embodiment of the present invention.

Referring to FIG. 2, an engine includes a combustion chamber 291 that can be activated or deactivated, and further includes a piston 298, a fuel injector 200, a high temperature medium injector 210, a low temperature medium injector 220, a heat exchanger 230, a medium pump 250, a reservoir 240, a condenser 260, a first line 251, a second line 254, a third line 256, and a fourth line 258 that are related to the combustion chamber 291.

Further, the engine further includes an intake valve and an exhaust valve that respectively sucks intake air and exhausts exhaust gas.

One combustion chamber 291 is displayed in the drawings, but as shown in FIG. 1, a combustion chamber 291 can be arranged corresponding to each cylinder, and the exhaust gas that is combusted with fuel is exhausted through an exhaust line 222.

The heat exchanger 230 is disposed on the exhaust line 222 and uses heat of the exhaust gas to heat a medium such as water.

The low temperature medium injector 220 is disposed at an upper middle portion of the combustion chamber 291, and the high temperature medium injector 210 is disposed at one side thereof. The high temperature medium injector 210 is connected to the heat exchanger 230 to receive a high temperature medium.

The medium pump 250 pumps the medium to the heat exchanger 230 through a third line 256, and the heat exchanger 230 supplies the high temperature medium injector 210 with a medium such as high temperature steam through the first line 251.

The medium pump 250 supplies the low temperature medium injector 220 with a low temperature medium through the second line 254, and the reservoir 240 is disposed on the second line 254 to temporarily store the medium.

As shown, the medium pump 250 supplies the high temperature medium injector 210 with the high temperature medium through the third line 256, the heat exchanger 230, and the first line 251, and supplies the low temperature medium injector 220 with the low temperature medium through the reservoir 240 and the second line 254.

The condenser is disposed at a downstream side of the heat exchanger 230 on the exhaust line 222 to condense the medium of the exhaust gas, and receives a low temperature medium from the medium pump 250.

Meanwhile, the fuel injector 200 is disposed on the intake line connected to the combustion chamber 299. While the fuel injector 200 is injecting gasoline or diesel fuel, the high temperature medium injector 210 and the low temperature medium injector 220 do not inject the medium in an exemplary embodiment of the present invention.

However, while the fuel injector 200 is not injecting fuel and is deactivated, the high temperature medium injector 210 or the low temperature medium injector 220 can inject the high temperature medium and the low temperature medium.

High temperature steam that is injected by the high temperature medium injector 210 increases the pressure of the combustion chamber 299 to generate kinetic energy through the descent of the piston 298, and the low temperature medium that is injected by the low temperature medium injector 220 reduces pressure of the combustion chamber 299 to allow the piston to ascend through the pressure reduction of the combustion chamber 299.

FIG. 3 is a schematic diagram of a composite power cycle engine according to an exemplary embodiment of the present invention.

Referring to FIG. 3, a control portion 300 controls the fuel injector 200, the high temperature medium injector 210, the low temperature medium injector 220, and the medium pump 250. The control portion 300 detects the driving condition of the engine and deactivates each cylinder through the detected driving condition.

The method in which the cylinder is deactivated has been known to the person skilled in the art, so the detailed description thereof will be omitted in an exemplary embodiment of the present invention.

The control portion 300 selects a cylinder that is to be deactivated according to the driving condition of the engine, and controls the fuel injector 200 such that the fuel is not injected.

Further, the control portion 300 controls the high temperature medium injector 210 and the low temperature medium injector 220 such that the high temperature medium and the low temperature medium are selectively injected by as much as a predetermined amount at predetermined timing in the deactivated cylinder.

The medium that is injected by the high temperature medium injector 210 or the low temperature medium injector 220 is expanded by the heat of the cylinder wall of the combustion chamber 291 to help the piston descend in an exemplary embodiment of the present invention. Further, the high temperature medium injector 210 can inject high temperature steam into the combustion chamber 299.

The high temperature medium injector 210 and the low temperature medium injector 220 can inject the medium including steam or water according to an exemplary embodiment of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A composite power cycle engine, comprising:
    a fuel injector that injects fuel into air that is or is to be supplied into a combustion chamber;
    a high temperature medium injector that injects a high temperature medium into the combustion chamber and increases pressure of the combustion chamber;
    a low temperature medium injector that injects a low temperature medium into the combustion chamber and reduces pressure of the combustion chamber; and
    a piston that is disposed in the combustion chamber to slidably move therein and that transforms gas expansion or contraction energy into kinetic energy;
    wherein the high temperature medium injector or the low temperature medium injector increases or reduces the pressure of the combustion chamber so as to generate power;
    wherein in a deactivated cylinder of which the fuel injector is not operated, the high temperature medium injector or the low temperature medium injector is disposed in the deactivated cylinder to be operated.

2. The composite power cycle engine of claim 1, wherein a plurality of cylinders includes:
    an activated cylinder of which the fuel injector is operated.

3. The composite power cycle engine of claim 1, wherein the high temperature medium of the high temperature medium injector is high temperature steam, and the low temperature medium is low temperature moisture that has a lower temperature than the high temperature steam.

4. The composite power cycle engine of claim 1, wherein the high temperature medium injector and the low temperature medium injector are not operated while the fuel injector is being operated.

5. The composite power cycle engine of claim 1, further comprising a heat exchanger that is disposed on an exhaust line through which an exhaust gas flows and fluid-connected to the high temperature medium injector via a first line, wherein the heat exchanger supplies the high temperature medium injector with the high temperature medium through the first line.

6. The composite power cycle engine of claim 5, further comprising a medium pump fluid-connected with the heat exchanger via a third line and supplies the low temperature medium to the heat exchanger through the third line such that the low temperature medium is changed into the high temperature medium.

7. The composite power cycle engine of claim 6, further comprising a condenser that is disposed at a downstream side of the heat exchanger on the exhaust line, wherein the condenser uses the low temperature medium that is supplied from the medium pump to condense moisture that is included in the exhaust gas.

8. The composite power cycle engine of claim 7, wherein the low temperature medium includes water.

9. The composite power cycle engine of claim 5, further comprising a medium pump that is fluid-connected with the low temperature medium injector via a second line and supplies the low temperature medium injector with the low temperature medium through the second line.

10. The composite power cycle engine of claim 9, further comprising a reservoir that is disposed between the medium pump and the low temperature medium injector on the second line to temporarily store the low temperature medium.

11. The composite power cycle engine of claim 9, further comprising a condenser that is disposed at a downstream side of the heat exchanger on the exhaust line, wherein the condenser uses the low temperature medium that is supplied from the medium pump to condense moisture that is included in the exhaust gas.

12. The composite power cycle engine of claim 1, wherein the high temperature medium and the low temperature medium include water or steam.

13. The composite power cycle engine of claim 1, wherein the fuel injector injects gasoline or diesel, and the low temperature medium injector and the high temperature medium injector respectively injects a medium of different temperatures including moisture.

14. A composite power cycle system, comprising:
a fuel injector that injects fuel into air that is or is to be supplied into a combustion chamber;
a high temperature medium injector that injects a high temperature medium into the combustion chamber and increases pressure of the combustion chamber;
a low temperature medium injector that injects a low temperature medium into the combustion chamber and reduces pressure of the combustion chamber;
a piston that is disposed in the combustion chamber to slidably move therein and that transforms gas expansion or contraction energy into kinetic energy; and
a control portion that controls the high temperature medium injector or the low temperature medium injector to increase or reduce the pressure of the combustion chamber so as to generate power through the piston;
wherein in a deactivated cylinder of which the fuel injector is not operated, the high temperature medium injector or the low temperature medium injector is disposed in the deactivated cylinder to be operated.

15. The composite power cycle system of claim 14, wherein a plurality of cylinders includes:
an activated cylinder of which the fuel injector is operated.

16. The composite power cycle system of claim 14, wherein the high temperature medium injector injects high temperature steam into the cylinder, and the low temperature medium injector injects low temperature moisture that has a lower temperature than the high temperature steam into the cylinder.

17. The composite power cycle system of claim 14, further comprising a heat exchanger that is disposed on an exhaust line through which an exhaust gas flows, wherein the heat exchanger supplies the high temperature medium injector with the high temperature medium through a first line that fluid-connects the heat exchanger to the high temperature medium injector.

18. The composite power cycle system of claim 14, wherein the fuel injector injects gasoline or diesel, and the low temperature medium injector and the high temperature medium injector respectively injects a medium of different temperatures including moisture.

* * * * *